(No Model.)
D. V. SHOLL.
FRICTION CLUTCH.
No. 600,178. Patented Mar. 8, 1898.
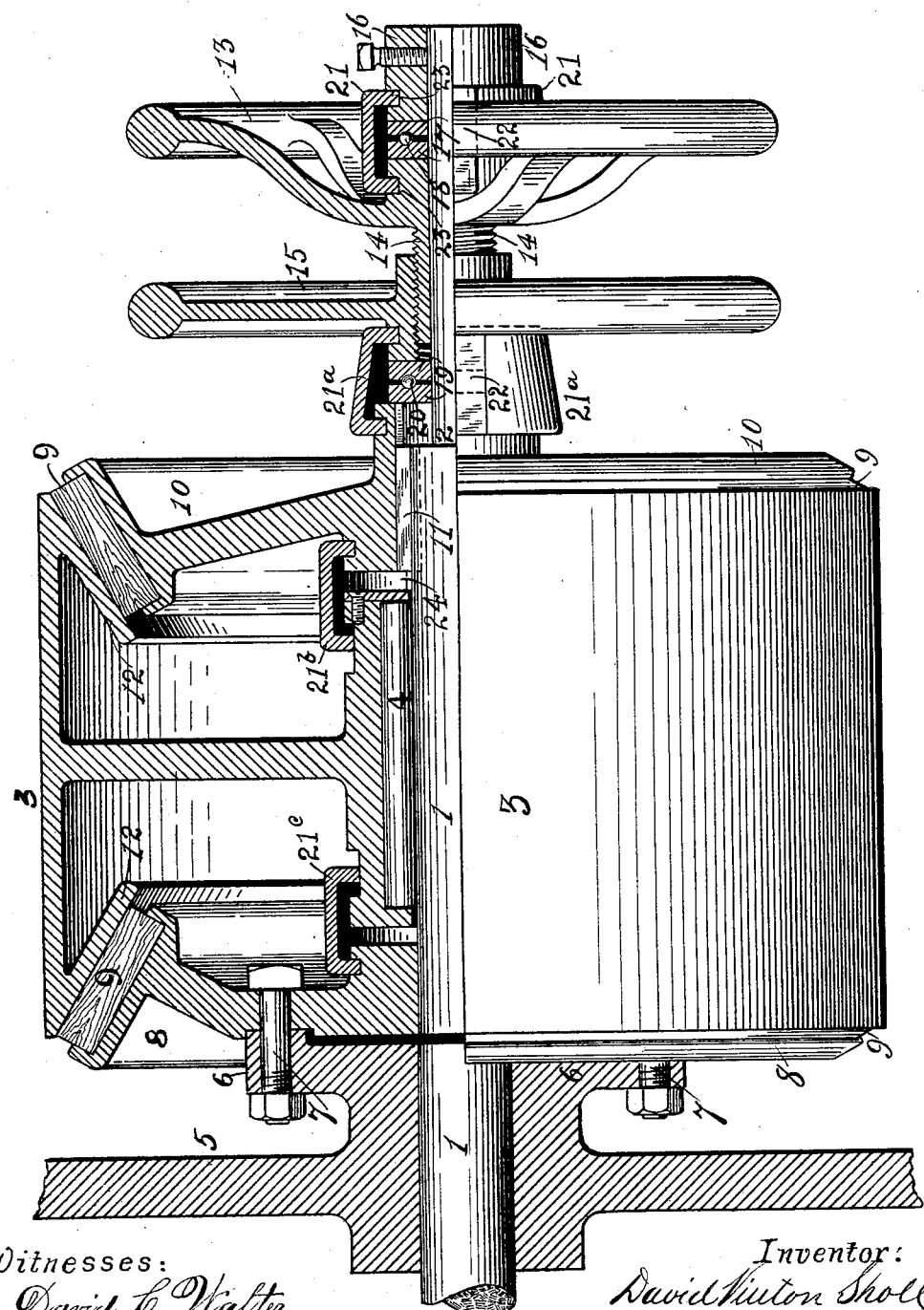
Witnesses:
David C. Walter
L. E. Brown
Inventor:
David Newton Sholl
By Newton Hall
His Attorney.

UNITED STATES PATENT OFFICE.

DAVID VINTON SHOLL, OF TOLEDO, OHIO.

FRICTION-CLUTCH.

SPECIFICATION forming part of Letters Patent No. 600,178, dated March 8, 1898.

Application filed June 28, 1897. Serial No. 642,554. (No model.)

*To all whom it may concern:*

Be it known that I, DAVID VINTON SHOLL, a citizen of the United States, residing at Toledo, Lucas county, Ohio, have invented certain new and useful Improvements in Friction-Clutches, of which the following is a specification.

My invention relates to and its object is to provide a friction-clutch in which the pulley or band-wheel may be thrown into and out of engagement with its shaft by means of hand-wheels upon the same shaft, and which shall be light, strong, compact, and easily and readily operated. I attain these objects by means of the device hereinafter described, and shown and illustrated in the accompanying drawing, made part hereof, in which the single figure is a side elevation of my clutch, the upper half being in vertical longitudinal section.

In the drawing, 1 is the shaft, the extremity of which is preferably reduced in diameter, as at 2. Mounted loose upon the shaft is a pulley or band-wheel 3, having interposed between it and the shaft antifriction-rollers 4.

5 is a fly-wheel fixed to the shaft 1. The fly-wheel here shown is designed to represent the fly-wheel of a gas-engine, my clutch being especially well adapted for use in connection with such an engine. The fly-wheel has upon its hub a flanged projection 6, to which is rigidly bolted, by means of bolts 7, a friction-disk 8, which carries around its periphery an inwardly-sloped friction block or shoe 9. At the opposite side of the pulley or band-wheel is another friction-disk 10, movable longitudinally upon the shaft 1, but rotating therewith by means of spline and groove 11. This friction-disk also carries upon its inwardly-inclined periphery a friction block or shoe 9. The band-wheel is provided with two inwardly-inclined friction-surfaces, as at 12, coinciding and adapted to contact with the friction-blocks 9. The advantage of this arrangement, due to the large area of frictional surfaces provided, is obvious. Mounted loose upon the shaft, near its outer extremity, is a hand-wheel 13, having an elongated hub 14, exteriorly screw-threaded, as shown. Mounted loose upon this screw-threaded hub 14 is another hand-wheel 15, the central bore of which is threaded to take the thread of the hub 14. Upon the shaft is rigidly fixed a collar 16. Between this collar and the hub of the hand-wheel 13 are interposed two rings 17 17, surrounding the shaft. In the adjoining faces of these two rings are races in which are placed antifriction-balls 18. Between the hub of the hand-wheel 15 and the hub of the friction-disk 10 and encircling the shaft are two rings 19 19, separated by ball-bearings 20.

21, 21ª, 21ᵇ, and 21ᶜ are broad bands having at each margin an inwardly-projecting flange. These bands are each divided diametrically, each half having radially-projecting flanges through which pass bolts by means of which the two halves when caused to encircle the shaft may be rigidly united, as shown by dotted lines at 22. The collar 16 and the outwardly-projecting hub of the hand-wheel 13 are circumferentially channeled, as at 23, and into these channels loosely fit the inwardly-projecting flanges of the band 21. The inwardly-projecting hub of the hand-wheel 15 and the outwardly-projecting hub of the friction-disk 10 are in like manner grooved or channeled circumferentially, and into these channels loosely fit the inwardly-projecting flanges of the band 21ª. The inwardly-projecting hub of the disk 10 and the neighboring outwardly-projecting portion of the hub of the band-wheel 3 are circumferentially grooved, and into these grooves or channels loosely fit the inwardly-projecting flanges of the band 21ᵇ. The channel in the hub of the band-wheel is wide enough to permit its limited movement longitudinally upon the shaft. This channel, to facilitate the assembling of the parts, is formed by diminishing the diameter of the hub at its end and by then bolting upon the end of the hub a ring 24, the projecting edge of which forms one side of the channel. The opposite end of the hub of the band-wheel and the hub of the disk 8 are in like manner connected by means of ring 21ᶜ, the channel in the hub of the band-wheel in this case being also wide enough to permit the limited movement of the band wheel or pulley longitudinally upon the shaft.

The parts being assembled as shown, the operation of my device is as follows: Assuming that the shaft is in motion and that the friction-shoes 9 9 are out of contact with the surfaces 12, the wheel 3 will be idle. The two hand-wheels, one upon the hub of the other, are also idle, but revolve slowly, owing to the slight friction of the loose bearing of the wheel 13 upon the shaft. Now if it is desired to communicate the motion of the shaft to the band wheel or pulley the two hand-wheels are grasped in the hands of the operator, wheel 13 is held rigidly with one hand, while the other wheel 15 is screwed forward upon its threaded bearing. The backward thrust of the wheel 15 is against the collar 16, through ball-bearings 17 18, and through ball-bearings 19 20. Its forward thrust forces the friction-disk 10 toward the interior of the pulley 3, bringing its shoe in contact with inclined surface 12. The motion of hand-wheel 15 is continued, and the disk 10 and the pulley 3 are crowded along the shaft until the disk 8 with its friction-shoe are encountered. The motion of the shaft is now communicated to the pulley, and the contact between the shoes 9 and the friction-surfaces 12 may thus be made as close as required. The contact and adjustment thus obtained continues until it is desired to throw the pulley out of gear. This is accomplished as follows: The two hand-wheels are again grasped by the operator. Wheel 13 is held fast. Wheel 15 is screwed away from the pulley. Wheel 13 pulls upon collar 16 through band 21. Wheel 15 pulls upon disk 10 through band 21ᵃ. Disk 10 pulls upon pulley 3 through band 21ᵇ, and the pulley moves away from the disk 8, the movement of the pulley in this direction being limited by the band 21ᶜ. The shoes 9 are now disengaged from the friction-surfaces 12 and the pulley 3 stands idle, as before. In addition to the function performed by the bands 21, 21ᵃ, 21ᵇ, and 21ᶜ of pulling the frictional contact-surfaces out of engagement they serve as guards to prevent access of dust and dirt to the bearings.

Modifications of my device will suggest themselves to those skilled in the art—such, for instance, as the omission of the roller-bearings for the pulley or forming the disk 8 integral with the fly-wheel 5.

Having described my invention, what I claim, and desire to secure by Letters Patent, is—

1. In a friction-clutch, a shaft, a pulley loose thereon and having friction-surfaces, friction-shoes revolubly secured to said shaft and adapted to contact with said friction-surfaces, a hand-wheel revolubly loose upon said shaft and having an elongated, screw-threaded hub, another screw-threaded hand-wheel mounted upon the first-mentioned hand-wheel, and connections intermediate said hand-wheels and said frictional members, whereby said shoes and said frictional surfaces may be thrown into and out of contact by screwing one hand-wheel onto or off of the other.

2. In a friction-clutch, as a means for throwing the frictional members thereof into and out of engagement with each other, a hand-wheel revolubly loose upon its shaft, a screw-threaded portion upon the hub of said hand-wheel, another screw-threaded hand-wheel mounted upon and adapted to be screwed onto or off of said first-mentioned hand-wheel, and connections intermediate said hand-wheels and the frictional members of said clutch.

3. A friction-clutch, comprising a shaft, a pulley loose upon said shaft having upon each margin an inwardly-inclined flange, a friction-disk fixed upon the shaft and adapted to contact with one of said flanges, another friction-disk fixed to revolve with said shaft but movable longitudinally thereon and adapted to engage the other of said flanges, a hand-wheel revolubly loose upon said shaft, a screw-threaded portion upon the hub of said hand-wheel, another screw-threaded hand-wheel mounted upon and adapted to be screwed onto or off of said first-mentioned hand-wheel, a collar fixed upon said shaft, ball-bearings between said collar and said first-mentioned hand-wheel, ball-bearings between said second-mentioned hand-wheel and said longitudinally-movable friction-disk, and bands having inwardly-turned flanges adapted to engage with and connect said collar and said first-mentioned hand-wheel, also the second-mentioned hand-wheel with the longitudinally-movable friction-disk, also the longitudinally-movable friction-disk with the pulley, and also the pulley with the fixed friction-disk, all substantially as and for the purpose specified.

DAVID VINTON SHOLL.

In presence of—
CHARLES M. HALL,
L. E. BROWN.